(12) United States Patent
Merkel

(10) Patent No.: US 8,181,306 B2
(45) Date of Patent: May 22, 2012

(54) WINDSHIELD WIPING DEVICE AND METHOD FOR THE OPERATION THEREOF

(75) Inventor: Wilfried Merkel, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 930 days.

(21) Appl. No.: 12/089,756

(22) PCT Filed: Sep. 25, 2006

(86) PCT No.: PCT/EP2006/066698
§ 371 (c)(1),
(2), (4) Date: Apr. 10, 2008

(87) PCT Pub. No.: WO2007/048669
PCT Pub. Date: May 3, 2007

(65) Prior Publication Data
US 2008/0209663 A1  Sep. 4, 2008

(30) Foreign Application Priority Data

Oct. 24, 2005  (DE) .......................... 10 2005 050 773

(51) Int. Cl.
*B60S 1/32* (2006.01)
*B60S 1/34* (2006.01)

(52) U.S. Cl. ........... 15/250.351; 15/250.202; 15/250.31; 15/250.34; 15/250.3

(58) Field of Classification Search ............. 15/250.351, 15/250.34, 250.31, 250.202
See application file for complete search history.

(56) References Cited

U.S. PATENT DOCUMENTS

| 2,146,396 | A | * | 2/1939 | Horton ........................ 15/250.34 |
| 2,752,626 | A | * | 7/1956 | Oishei ....................... 15/250.202 |
| 3,045,272 | A | * | 7/1962 | Oishei ......................... 15/250.13 |
| 3,176,336 | A | * | 4/1965 | Scinta ....................... 15/250.351 |
| 3,213,478 | A |   | 10/1965 | Pollock |
| 3,292,900 | A | * | 12/1966 | Pettersen ....................... 416/218 |
| 3,427,675 | A | * | 2/1969 | Tibbet ........................ 15/250.04 |
| 5,161,280 | A | * | 11/1992 | Sumiya et al. ............ 15/250.202 |
| 5,430,907 | A | * | 7/1995 | Jutras .......................... 15/250.21 |
| 5,634,235 | A | * | 6/1997 | Hultquist et al. ........... 15/250.34 |
| 6,129,093 | A | * | 10/2000 | Kelly ................................ 134/6 |
| 6,279,409 | B1 | * | 8/2001 | Knauf ............................... 74/25 |
| 6,651,292 | B2 | * | 11/2003 | Komerska ................. 15/250.32 |

(Continued)

FOREIGN PATENT DOCUMENTS

JP  06270768  9/1994

OTHER PUBLICATIONS

PCT/EP2006/066698 International Search Report.

*Primary Examiner* — Gary Graham
*Assistant Examiner* — Michael Jennings
(74) *Attorney, Agent, or Firm* — Michael Best & Friedrich LLP

(57) ABSTRACT

Disclosed is a windshield wiping device for a motor vehicle. A wiper arm is connected to a wiper bearing pin, the wiper arm being driven via the wiper bearing pin. The inventive windshield wiping device is characterized in that the wiper bearing pin is geometrically oriented in such a way that the lifting angle of the wiper arm changes in substantially one direction when the wiper arm performs a wiping movement across a windshield.

13 Claims, 6 Drawing Sheets

U.S. PATENT DOCUMENTS

| | | | |
|---|---|---|---|
| 6,658,691 B2 * | 12/2003 | Muramatsu | 15/250.352 |
| 6,691,367 B2 * | 2/2004 | Hoshino | 15/250.3 |
| 6,859,985 B1 * | 3/2005 | Nakazawa et al. | 29/428 |
| 6,862,772 B2 * | 3/2005 | Weiler | 15/250.351 |
| 6,964,080 B2 * | 11/2005 | Knauf | 15/250.352 |
| 7,014,717 B1 * | 3/2006 | Lahti | 134/42 |
| 7,152,270 B2 * | 12/2006 | Genick et al. | 15/250.19 |
| 2001/0016964 A1 | 8/2001 | Hoshino | |
| 2002/0144373 A1 | 10/2002 | Muramatsu | |
| 2002/0157204 A1 * | 10/2002 | Kraus et al. | 15/250.352 |

* cited by examiner

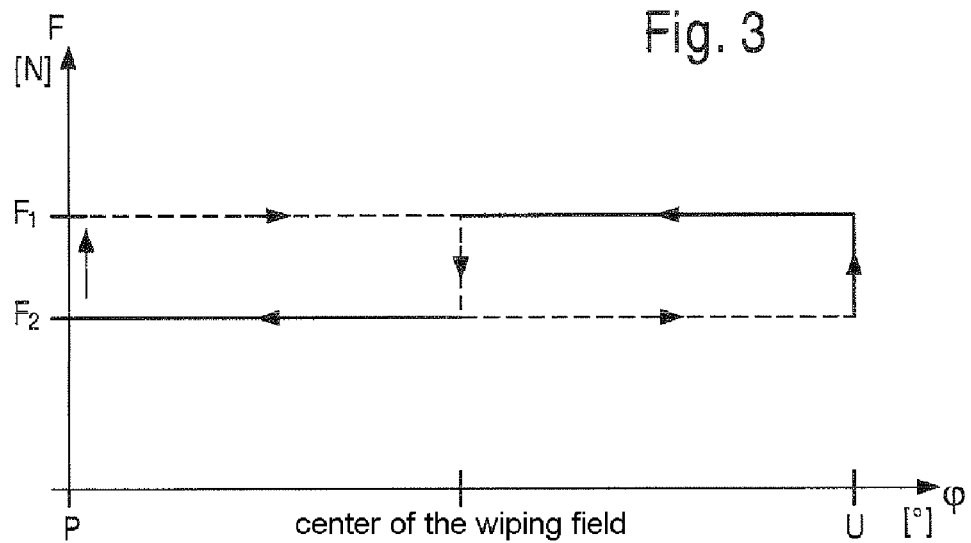
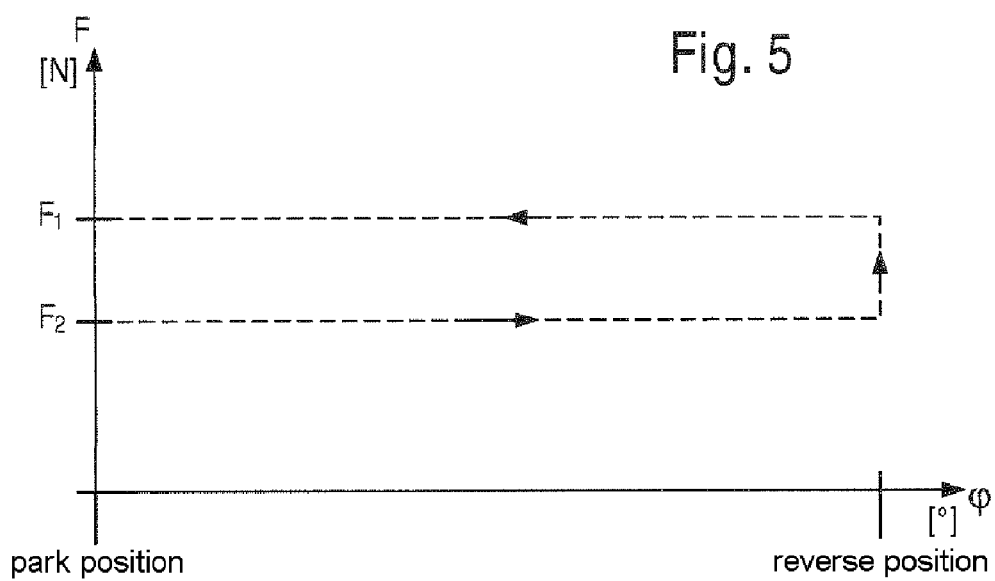

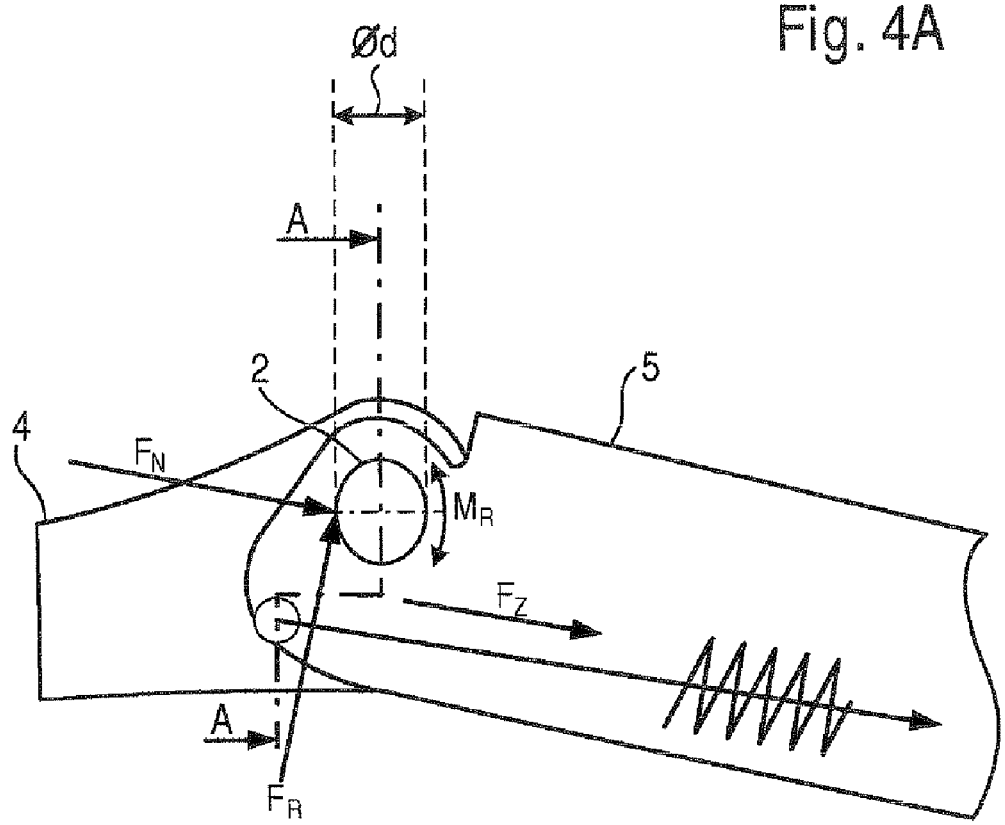
Fig. 4A
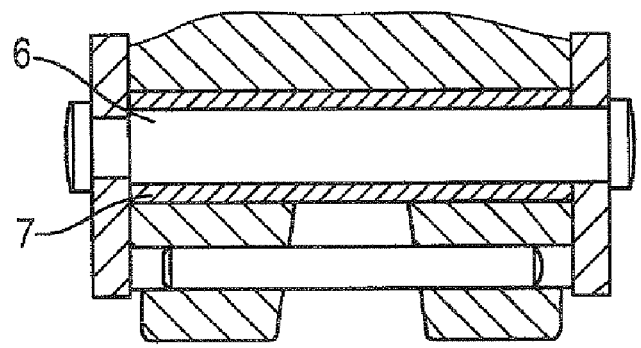
section A - A

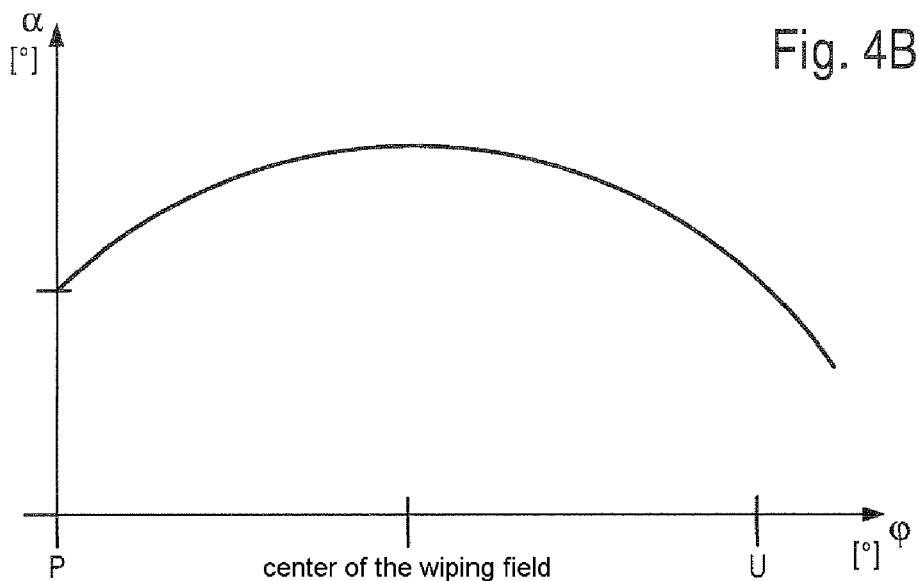
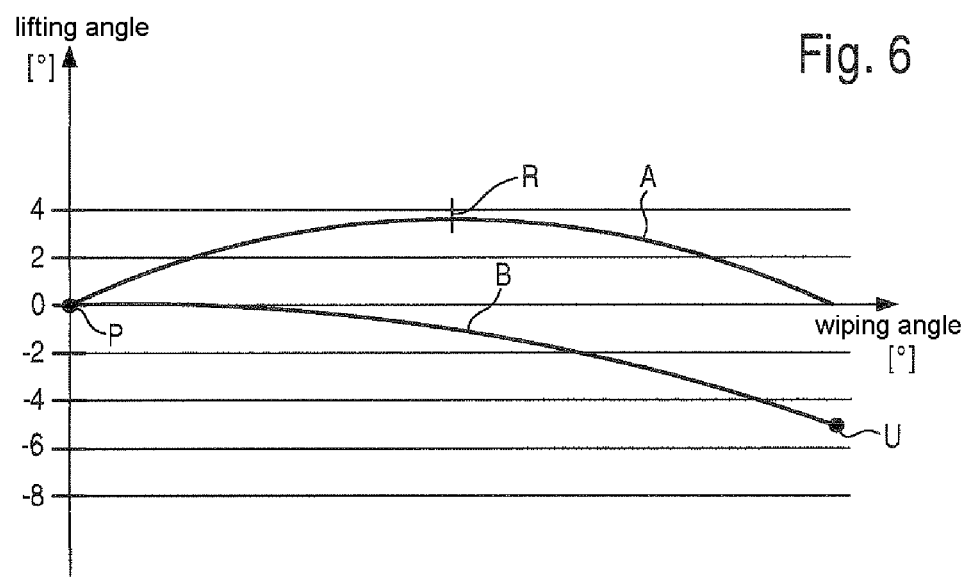

WINDSHIELD WIPING DEVICE AND METHOD FOR THE OPERATION THEREOF

BACKGROUND OF THE INVENTION

The invention relates to a windshield wiping device and a method for the operation of a windshield wiping device.

It is known that windshield wiping devices for motor vehicles generally comprise a wiper arm which is driven via a wiper bearing pin. In this case, one or more wiper bearing pins are generally aligned geometrically such that they are located approximately perpendicular to a window surface in the region of an imaginary piercing point of the wiper bearing pins through the extended window surface. It is also known that the geometric alignment of the wiper bearing pins is configured such that in the reverse positions of the wiper arms a so-called tilting aid is implemented. In this case, in the reverse positions and/or end positions of a wiping field on the windshield, the wiper blade guided by the wiper arm is already inclined in the new opposing direction of movement of the wiper arm, in order to assist the tilting of a wiper blade rubber of the wiper blade.

Generally, such geometric orientations of the wiper bearing pins at moderate driving speeds exhibit good wiping results, provided that the components used are technically faultless. At high driving speeds, however, the conventional windshield wiping devices may have reduced wiping quality. A reason therefor may be a reduced force of the wiper arm spring with a resulting reduced pressing force of the wiper arm on the windshield. The reduced wiping quality may be further caused by aerodynamic forces on the wiper arm, which act disadvantageously on the pressing force of the wiper arm.

Due to an angled position of the wiper lip of the wiper blade rubber during the wiping operation against the air flow (downward wiping) higher lifting forces may result than when wiping with the flow (upward wiping). Conventional attempts to deal with this situation are by rotating the wiper arm pivot pin relative to the wiper bearing pin. By such a rotated joint, the pressing force of the wiper arm may be increased when wiping against the air flow. On the one hand, however, this measure only has a limited effect; on the other hand, it also disadvantageously requires more powerful wiper motors and thus increased costs. The aforementioned reduced wiping quality may also be compensated by the use of spoilers on the wiper arm and/or on the wiper blade or even by a more powerful wiper arm spring, which generates an increased pressing force. However, these measures also result in increased costs and may disadvantageously also reduce the service life of the wiper blades, which results from increased rubber deformation.

SUMMARY OF THE INVENTION

It is the object of the invention to provide a windshield wiping device with improved operating characteristics.

A windshield wiping device according to the present invention is provided for a motor vehicle, a wiper arm being connected to a wiper bearing pin, and the wiper arm being driven via the wiper bearing pin. The windshield wiping device is characterized in that the wiper bearing pin has a geometric orientation such that during a wiping movement of the wiper arm across a window an alteration in substantially one direction of the angular position of the part of the wiper arm guiding the wiper blade is carried out relative to the part connected to the wiper bearing shaft.

By the alteration in substantially one direction of the lifting angle of the wiper arm during the wiping movement, lifting forces which act during the operational mode of the windshield wiping device as a result of driving wind on the windshield wiping device are more advantageously equalized and as a result their disadvantageous effect is reduced. As a result, a wiping quality of the windshield wiping device may be advantageously increased in comparison with conventional windshield wiping devices. Moreover, long-term operating characteristics of the windshield wiping device may also be positively influenced as a result of reduced wear of the wiper arm and further components of the windshield wiping device.

A preferred development of the windshield wiping device according to the invention provides that the alterations in substantially one direction of the lifting angle are carried out between a park position and a reverse position. Thus the improved operating characteristics and advantageous effects of the windshield wiping device according to the invention are shown to advantage during complete wiping processes between the park and reverse position of the windshield wiping device. Improved wiping quality which meets requirements is thus permanently assisted across the entire wiping area of a windshield of the motor vehicle.

In a further preferred embodiment of the windshield wiping device according to the invention it is provided that the wiper bearing pin is, moreover, geometrically aligned such that in the park position and/or in the reverse position a function of a tilting aid for a wiper blade of the wiper arm is embodied. Thus the tilting aid already known in the prior art is included advantageously by the alignment of the wiper bearing pin according to the invention. A long service life of the wiper blade rubber used during the wiping operation is thus advantageously assisted by the windshield wiping device according to the invention.

BRIEF DESCRIPTION OF THE DRAWINGS

The invention is described in more detail hereinafter with reference to a plurality of figures, in which:

FIG. 3 shows a conventional principal path of the pressing force of the wiper arm across the wiping angle;

FIG. 4A shows two detailed views of the conventional wiper arm of FIG. 1;

FIG. 4B shows a conventional principal path of the lifting angle across the wiping angle; and FIG. 5 shows a path of the pressing force according to the invention across the wiping angle; and FIG. 6 shows the principal paths of the lifting angle across the wiping angle.

DETAILED DESCRIPTION

Figure 1:
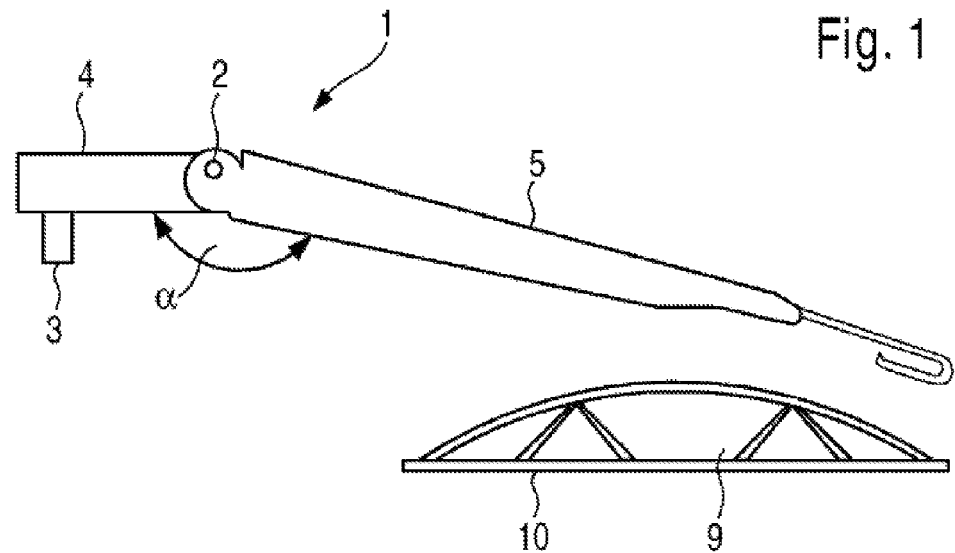
FIG. 1 shows a principal construction of a conventional wiper arm with a wiper blade.

FIG. 1 shows a principal view of an embodiment of a conventional wiper arm 1. In this case, the wiper arm 1 has a lower region 4 and an upper region 5 which are movably connected to one another by a wiper arm pivot pin 2. Between the lower region 4 and the upper region 5 of the wiper arm 1 a lifting angle α of the wiper arm 1 is formed by a rotation about the wiper arm pivot pin 2. The wiper arm 1 is mechanically driven by a wiper bearing pin 3 which is fixedly connected to the lower region 4 of the wiper arm 1. It is conceivable, for example, that the wiper bearing pin 3 is connected via a driving rod assembly to an electric motor 8 (not shown in FIG. 1) which drives the wiper arm 1 via the wiper bearing pin 3. It may further be seen from FIG. 1 that the wiper arm 1 comprises a curved region at one front end remote from the wiper bearing pin 3, in which a wiper blade 9 with a wiper blade rubber 10 may be fastened.

Figure 2:
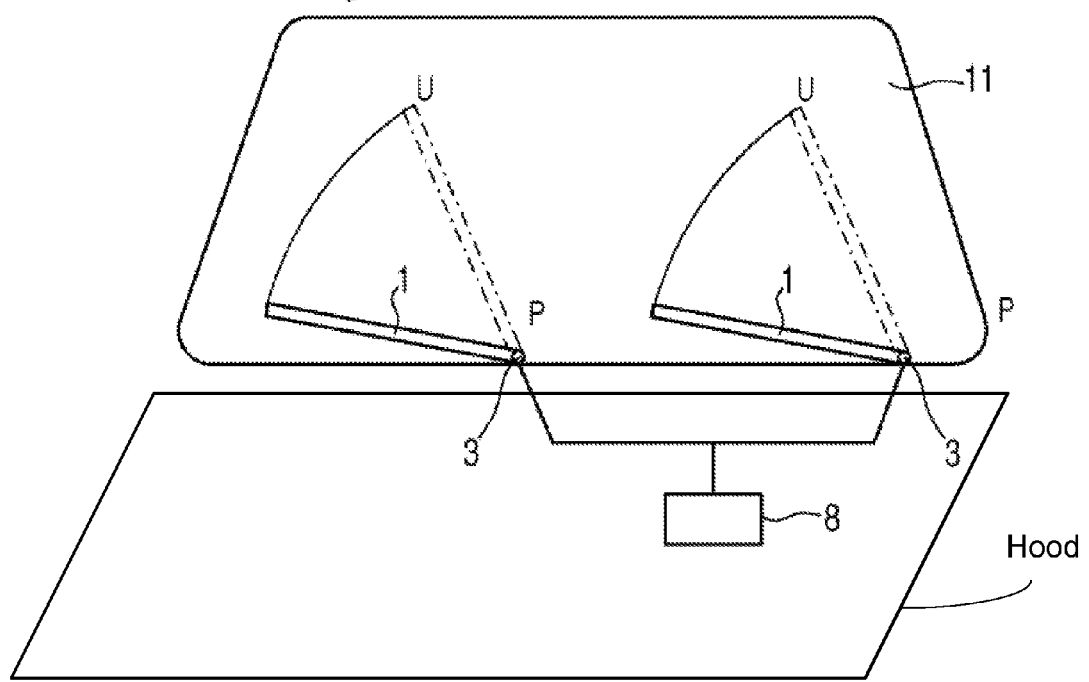
FIG. 2 shows a principal view of a windshield of a motor vehicle with two wiper arms, which are driven by an electric motor.
Figure 7A:
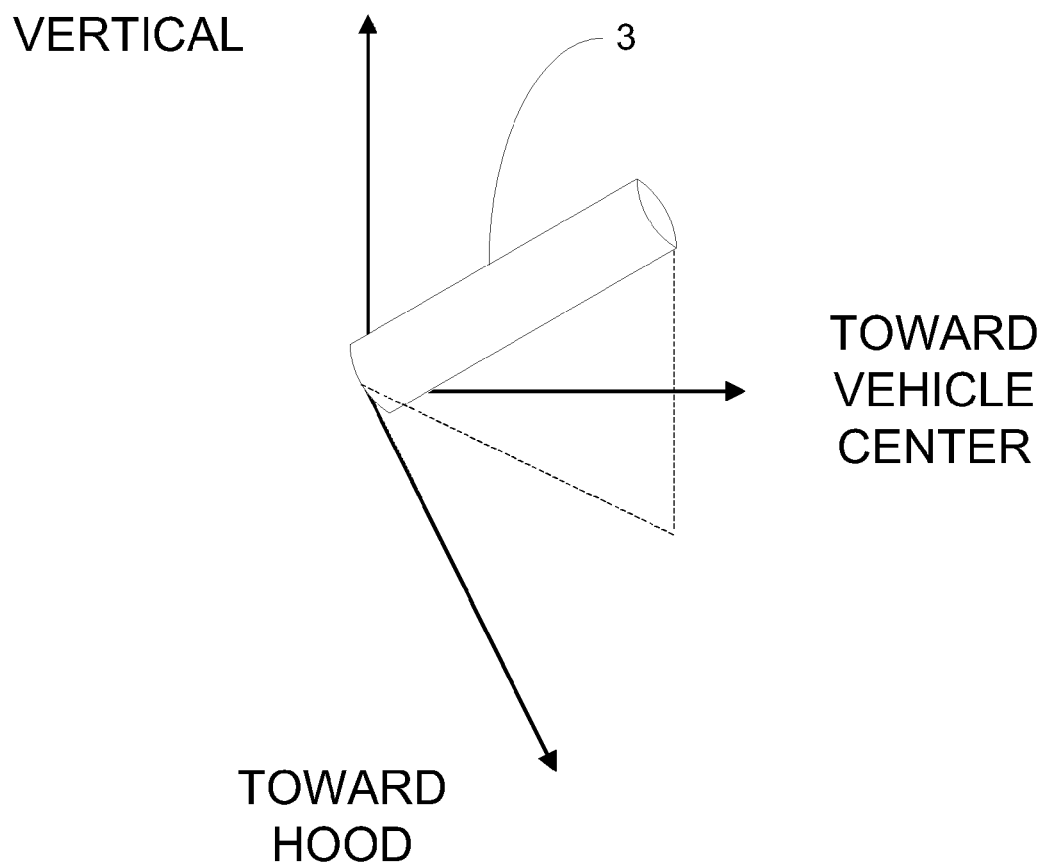
FIG. 7A shows schematic representation of the geometric orientation of the wiper bearing pin on the left side of FIG. 2.
Figure 7B:
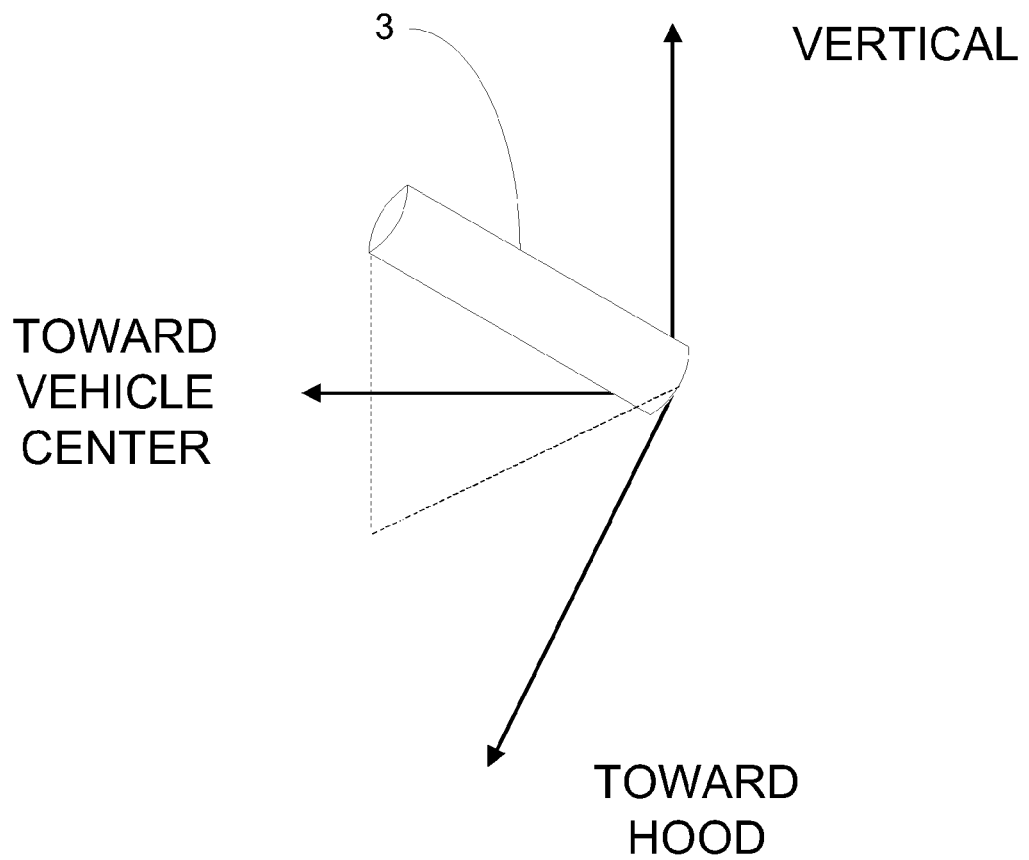
FIG. 7B shows schematic representation of the geometric orientation of the wiper bearing pin on the right side of FIG. 2.

FIG. 2 shows a principal view of a windshield 11 of a motor vehicle on which a windshield wiping device is used with wiper arms 1. It is seen that the windshield 11 in this embodiment is wiped by two wiper arms 1, the two wiper arms 1 being driven via one respective separate wiper bearing pin 3. The two wiper arms 1 may have in end positions on the windshield 11 one respective park position P or reverse position U, which define regions on the windshield 11 to be wiped by the wiper arms 1.

The two wiper arms 1 may be driven by the electric motor 8 via a drive mechanism shown in very simple form in FIG. 2 which generates an oscillating movement of the wiper arms 1 on the windshield 11. Conventionally, the wiper bearing pin 3 in relation to the windshield 11 is geometrically oriented such that the wiper arm 1 is aligned in the two positions P, U such that the wiper blade 9 is already inclined in the positions P, U in the new direction of movement ("tilting aid"). As a result, advantageously, tilting a wiper lip of the wiper blade rubber is facilitated, whereby the service life of the wiper blade rubber is increased and disadvantageous "chattering" of the wiper blade rubber on the windshield 11 is avoided as a result of not being tilted. The wiper blade rubber may, in this manner, be "pulled" from the end positions P, U in an improved manner into the respectively opposing end position P, U.

FIG. 3 shows a principal path of the pressing force F of the wiper arm 1 across a wiping angle φ. It may be seen that in the park position P (wiping angle φ≈0°) the wiper arm 1 is pressed against the windshield 11 with a force $F_1$. In the course of the movement of the wiper arm from the park position P to the reverse position U, a sudden drop in the pressing force F occurs approximately in the center of the wiping field. The wiping process takes place in the direction of the reverse position U, therefore, at a reduced pressing force $F_2$ (dotted path) from the center of the wiping field. In the reverse position U the pressing force of the wiper arm jumps from the value $F_2$ to the value $F_1$, in order to continue the wiping process from the reverse position U into the park position P.

This phase of the wiping process ("downward wiping") is carried out when the motor vehicle is driven against the driving wind, and as a result is met by increased lifting forces on the wiper arm 1. Approximately in the center of the wiping field, a drop in the pressing force from the greater value $F_1$ to the lower value $F_2$ again results, in order to be subsequently continued as far as the park position P at the reduced force $F_2$. Thus a hysteresis occurs in the path of the pressing force F, the wiping field being disadvantageously wiped during the wiping process between the park position P and the reverse U at pressing forces F of different values.

It is clear from FIG. 4A why, approximately in the center of the wiping field, jumps in the pressing force F shown in FIG. 3 result. To this end, with reference to FIG. 4A, a simplified kinematic analysis of the wiper arm 1 is carried out, from which forces and moments acting on the wiper arm 1 may be identified. FIG. 4A shows in a left-hand illustration an enlarged detail of FIG. 1. In this case, the lower region 4 of the wiper arm 1, the upper region 5 of the wiper arm 1 as well as the wiper arm pivot pin 2 which movably connects the two regions 4, 5 of the wiper arm 1 to one another, are shown. In a right-hand illustration of FIG. 4A, which shows a sectional view A-A of the left-hand illustration of FIG. 4A, it may be seen why in the wiper arm pivot pin 2 Coulomb frictional forces $F_R$ occur. Said Coulomb frictional forces are primarily the reason why the wiper arm pivot pin 2 is configured as a pin 6 and a bush 7, the aforementioned frictional forces $F_R$ occurring as a result of a rotation of the pin 6 in the bush 7, under load by the wiper arm spring.

In the left-hand illustration of FIG. 4A, moreover, it is shown that by an action of a wiper arm spring (shown schematically in FIG. 4A) a tensile force $F_Z$ is exerted on the wiper arm pivot pin 2 in the axial direction toward the upper region 5. This tensile force $F_Z$ acts substantially as a normal force $F_N$ acting on the wiper arm pivot pin 2. By a rotation of the upper region 5 about the wiper arm pivot pin 2 a moment of friction $M_R$ in the wiper arm pivot pin 2 is generated by the frictional force $F_R$. This friction (Coulomb friction) in the wiper arm joint makes the rotational movement of the movable wiper arm part about the wiper arm pivot pin 2 difficult. It thus reduces the pressing force F when lowering the wiper arm end (reducing the lifting angle α) and assists the pressing force F when lifting the wiper arm end (increasing the lifting angle α) during wiping. In the described manner, therefore, the hysteresis shown in FIG. 3 of the pressing force F is generated when lifting and lowering the wiper arm 1. The moment of friction $M_R$ may be mathematically expressed as follows:

$$M_R = \tfrac{1}{2} \cdot d \cdot F_R$$

with the parameters:
$M_R$—moment of friction
d—diameter of the wiper arm pivot pin 2
$F_R$—frictional force A connection between the frictional force $F_R$ and the normal force $F_N$ on the wiper arm pivot pin 2 may be mathematically expressed as follows:

$$F_R = \mu \cdot F_N$$

with the parameters:
$F_R$—frictional force on the wiper arm pivot pin 2
$F_N$—normal force on the wiper arm pivot pin 2
μ—frictional coefficient FIG. 4B shows a principal path of the lifting angle α across the wiping angle φ according to the prior art. It may be seen that due to the wiper bearing pin 3 aligned substantially perpendicular to the window surface, starting from the park position P the lifting angle α continuously rises toward the center of the wiping field. From the center of the wiping field to the reverse position U the lifting angle α is again reduced during the wiping, in order to rise again in the opposing wiping direction toward the center of the wiping field, and to drop from the center of the wiping field toward the park position P. The Coulomb frictional force in the wiper arm pivot pin 2 assists the pressing force F with a wiping path from the park position P to the center of the wiping field. It reduces, however, the pressing force F when wiping approximately from the center of the wiping field as far as the reverse position U. Thus the frictional force, on the one hand, works advantageously in an assisting manner and, on the other hand, however, disadvantageously in a reducing manner on the pressing force F.

With the kinematics of the wiper arm 1 explained with reference to FIG. 4A, it is thus clear why the pressing force F with conventional wiper systems undergoes the sudden jumps in the pressing force at the center of the wiping field which may disadvantageously permanently impair the wiping quality, in particular at high driving speeds.

According to the invention, the wiper bearing pin 3 is now geometrically aligned such that as a result of this alignment across the entire wiping path an alteration in substantially one direction of the lifting angle α is produced across the wiping angle φ. The lifting angle α has in the park position P a maximum value and in the reverse position U a minimum value. As a result, during the entire wiping from the reverse position U to the park position P, the Coulomb frictional force in the wiper arm pivot pin 2 assists the pressing force F, which means advantageous operational characteristics where lifting forces are present on the wiper arm 1 as a result of driving wind. The pressing force $F_1$ is thus advantageously at a maximum just when it is required and thus generates improved and uniform wiping results. When wiping from the park position P to the reverse position U wiping is carried out at the reduced pressing force $F_2$. This is sufficient for a good wiping result as the wind force substantially assists the pressing force F during upward wiping.

For a windshield wiping system according to the invention, therefore, a path of the pressing force across the wiping angle φ results, as is shown in principle in FIG. 5. It may be seen from FIG. 5 that the disadvantageous hysteresis in the prior art only occurs once in the path of the pressing force. This means that the conventional jump in the pressing force approximately at the center of the wiping field is eliminated and a wiping process of the wiper arm 1 between the end positions P, U is carried out with respectively constant pressing force F. When wiping from the park position P ("upwards") the wiping is carried out at the lower pressing force $F_2$ and when wiping from the reverse position ("downwards") wiping is carried out at the higher pressing force $F_1$. It is, therefore, regarded as particularly advantageous that the abrupt alteration to the pressing force in the center of the wiping field is avoided and with downward wiping against the driving wind the higher pressing force $F_1$ is constantly used. This higher pressing force F is, in particular, advantageous for compensating for the higher lift in said wiping direction.

Compared to the conventional wiper systems, with the windshield wiping device according to the invention, when the bearing force remains the same, substantially higher driving speeds of the motor vehicle are possible with very good wiping quality. Provided that the previous operating characteristics of the windshield wiping device are sufficient at high driving speeds, by means of the invention the pressing force F may be advantageously reduced and/or a smaller and thus more cost-effective wiper motor may be used. The service life of the components used may thus be permanently increased.

With the invention it is regarded as advantageous, moreover, that the tilting aid known in the prior art is also implemented with the windshield wiping device according to the invention. To this end, the geometric alignment of the wiper bearing pin 3 is further configured such that the angular difference which is necessary for the function of the tilting aid is achieved between the wiper blade position in the park position P and in the reverse position U. In order, therefore, to achieve substantially uniform properties of the tilting aid in the park position P and in the reverse position U, it may be advantageous to provide a twisting ("transposition") of the upper region 5 of the wiper arm 1 in relation to the lower region 4.

An optimal geometric alignment according to the invention may be detected by means of a computer program on a data processing system, for example a CAD-3D simulation. The alignment according to the invention of the wiper bearing pin is characterized in that it is configured substantially more in the direction of the vehicle center and in the direction of the hood relative to conventional alignments. By means of the aforementioned twisting, the function of the tilting aid may be fine-tuned and/or corrected or weighted between the park position P and the reverse position U.

FIG. 6 shows two paths of the lifting angle α across the wiping angle φ. In this case, FIG. 6 shows in a path A, a conventional path of the lifting angle α across the wiping angle φ, in which the lifting angle α rises approximately toward the center of the wiping field and subsequently drops toward the reverse position U. A reverse point of the lifting angle α is denoted at R. In contrast therewith, in FIG. 6 in a path B, a path of the lifting angle α according to the invention is shown across the wiping angle φ. It may be seen that a substantially constant reduction of the lifting angle α continuously results from the park position P to the reverse position U. The size of the lifting angle α shown in FIG. 6 in degrees may be seen as being merely by way of example.

The aspects of the invention disclosed in the claims, the description and the figures may be essential for the invention in any combination.

The invention claimed is:

1. A windshield wiping device for a windshield (11) of a motor vehicle, the windshield (11) having a surface, the motor vehicle having a center and a hood positioned forwardly of the windshield (11), the device comprising a wiper arm (1) connected to a wiper bearing pin (3) having an axis, the wiper arm (1) being driven via the wiper bearing pin (3), a lifting angle (α) of the wiper arm (1) being defined between a first portion of the wiper arm (1) and a second portion of the wiper arm (1) and being in a plane perpendicular to the surface of the windshield (11), the wiper bearing pin (3) being positioned to one side of the center of the vehicle and intersecting an extension of the surface of the windshield (11), characterized in that the wiper bearing pin (3) has a geometric orientation of its axis relative to a line generally perpendicular to the extension of the surface of the windshield (11), the geometric orientation being toward the hood and toward the center of the vehicle such that, during a wiping movement of the wiper arm (1) across windshield (11), a change in substantially one direction of a value of the lifting angle (α) of the wiper arm (1) is carried out.

2. The windshield wiping device as claimed in claim 1, characterized in that the change of the value of the lifting angle (α) in substantially one direction is carried out between a park position (P) and a reverse position (U).

3. The windshield wiping device as claimed in claim 2, characterized in that the lifting angle (α) of the wiper arm (1) during the movement of the wiper arm (1) from the park position (P) into the reverse position (U) changes from a maximum value to a minimum value and during the movement of the wiper arm (1) from the reverse position (U) to the park position (P) changes from a minimum value to a maximum value.

4. The windshield wiping device as claimed in claim 3, characterized in that the wiper bearing pin (3) is geometrically oriented such that at least one of in the park position (P) and in the reverse position (U) a function of a tilting aid for a wiper blade (9) of the wiper arm (1) is implemented.

5. The windshield wiping device as claimed in claim 4, characterized in that the wiper arm (1) is configured such that the function of the tilting aid in the park position (P) and in the reverse position (U) is substantially uniformly implemented.

6. The windshield wiping device as claimed in claim 2, characterized in that the wiper bearing pin (3) is geometrically oriented such that at least one of in the park position (P) and in the reverse position (U) a function of a tilting aid for a wiper blade (9) of the wiper arm (1) is implemented.

7. The windshield wiping device as claimed in claim 1, characterized in that the wiper bearing pin (3) is geometrically oriented such that at least one of in the park position (P) and in the reverse position (U) a function of a tilting aid for a wiper blade (9) of the wiper arm (1) is implemented.

8. The windshield wiping device as claimed in claim 7, characterized in that the wiper arm (1) is configured such that the function of the tilting aid in the park position (P) and in the reverse position (U) is substantially uniformly implemented.

9. A windshield wiping device for a windshield (11) of a motor vehicle, the windshield (11) having a surface, the motor vehicle having a center and a hood positioned forwardly of the windshield (11), the device comprising a wiper arm (1) connected to a wiper bearing pin (3) having an axis, the wiper arm (1) being driven via the wiper bearing pin (3), a lifting angle ($\alpha$) of the wiper arm (1) being defined between a first portion of the wiper arm (1) and a second portion of the wiper arm (1) and being in a plane perpendicular to the surface of the windshield (11), the wiper bearing pin (3) being positioned to one side of the center of the vehicle and intersecting an extension of the surface of the windshield (11), characterized in that, relative to a line generally perpendicular to the extension of the surface of the windshield (11), the wiper bearing pin (3) has a geometric orientation with the axis of the bearing pin (3) being toward the hood and toward the center of the vehicle, the geometric orientation of the wiper bearing pin (3) causing, during a wiping movement of the wiper arm (1) across a windshield (11) from one of a parking position (P) and a return position (U) to the other of the parking position (P) and the return position (U), one of an increase and a decrease of a value of the lifting angle ($\alpha$) of the wiper arm (1).

10. The windshield wiping device as claimed in claim 9, characterized in that, during the movement of the wiper arm (1) from the park position (P) to the reverse position (U), the geometric orientation of the wiper bearing pin (3) causes the lifting angle ($\alpha$) of the wiper arm (1) to decrease from a maximum value to a minimum value.

11. The windshield wiping device as claimed in claim 9, characterized in that, during the movement of the wiper arm (1) from the reverse position (U) to the park position (P), the geometric orientation of the wiper bearing pin (3) causes the lifting angle ($\alpha$) of the wiper arm (1) to increase from a minimum value to a maximum value.

12. The windshield wiping device as claimed in claim 9, characterized in that geometric orientation of the wiper bearing pin (3) provides, in at least one of the park position (P) and the reverse position (U), a tilting aid for a wiper blade (9) of the wiper arm (1).

13. The windshield wiping device as claimed in claim 12, characterized in that geometric orientation of the wiper bearing pin (3) substantially uniformly provides, in the park position (P) and the reverse position (U), a tilting aid for a wiper blade (9) of the wiper arm (1).

* * * * *